Nov. 21, 1933.  N. H. VAN HARPEN  1,936,490
PROCESS AND THE APPARATUS FOR PREPARING SHEET
RUBBER AND THE PRODUCT OBTAINED BY IT
Filed April 30, 1931
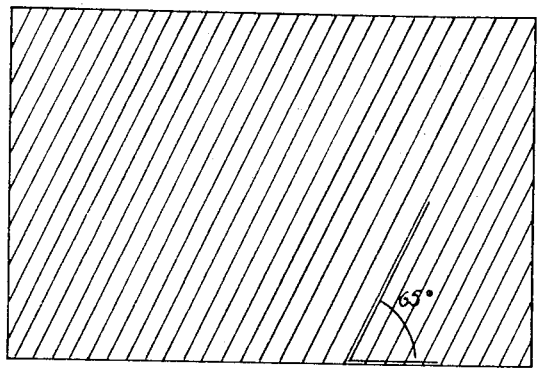
Fig. 1.
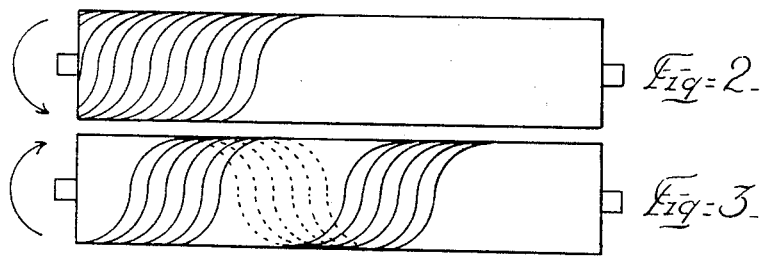
Fig. 2.
Fig. 3.
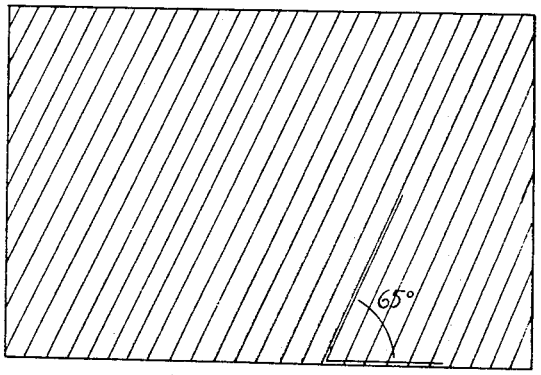
Fig. 4.
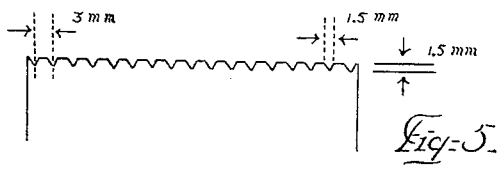
Fig. 5.
N. H. Van Harpen
INVENTOR
By: Marks & Clerk
ATTYS.

Patented Nov. 21, 1933

1,936,490

UNITED STATES PATENT OFFICE 1,936,490

PROCESS AND THE APPARATUS FOR PREPARING SHEET RUBBER AND THE PRODUCT OBTAINED BY IT

Nicolaas Hendrik van Harpen, Medan, Sumatra, Dutch East Indies, assignor to Algemeene Vereeniging Van Rubberplanters Ter Oostkust Sumatra, Medan, Sumatra, Dutch East Indies Application April 30, 1931, Serial No. 534,146, and in the Netherlands May 6, 1930

6 Claims. (Cl. 18—50)

The invention relates to a process for preparing sheet rubber in such a form that it dries quickly, and to the apparatus necessary for it as well as to the product obtained by it.

It is known to separate rubber from the latex by evaporating (atomizing) the water contained in the latex or by the coagulation of the latex and the evaporation of the water included in the coagulum.

The process mentioned which produces the so-called sprayed-rubber however requires an expensive installation and requires continuous heating during the operation. Moreover the product is very voluminous so that packing and transportation become difficult. This kind of rubber has not obtained a place on the open market but is delivered only directly from the producer to the customer.

This however is quite different from the preparation of smoked sheet rubber or crepe-rubber, which has been used for many years, and for which the latex is not evaporated or atomized, but is first transmuted into a solid rubber cake which, after having undergone mechanical treatment, is dried and put on the market in the form of sheets.

The smoked sheet rubber is prepared by diluting the latex to a dry-rubber-grade of 15–20%, after which there is used so much latex, that a rubber cake is formed at least 4 cm. thick, which cake is pressed out by laminating calenders until a thickness of 3 to 5 mm. is obtained (see e. g. Dr. O. de Vries "Bereiding en Eigenschappen van plantage rubber"). To obtain the desired thickness of the rubber cake it is necessary to use the latex-concentrations mentioned in order to prevent the presence of air- or gas bubbles in the rubber cake, which make the quality inferior. The coagulation of these cakes requires one or three hours and sometimes the coagulum is laminated only after 18 hours. The thickness of 3 to 5 mm. is chosen in order to make the rubber sheet not too brittle, and to prevent its bagging out, tearing and becoming unsalable after drying and during the smoking while being suspended on the horizontal bars.

After the laminating has been completed the laminated rubber cakes are exposed to the influence of hot smoke in especially built smoke-houses, while suspended vertically on horizontal laths after which, corresponding to the thickness of the rubber cakes, the cakes become quite dry and thoroughly smoked after 6 to 12 days. During the smoking process the temperature is held between 40° and 50° C. The cake of sheet rubber being only flattened out, unlike the crepe-rubber to which will be referred later on, this temperature will not have a bad influence on the qualities of the rubber. The natural substances which check the oxidation of the rubber parts (so called antioxidants) are still present in sufficient quantity.

A piece of sheet rubber with the thickness of about 5 mm. is smoked in about 10 days, whilst a piece of a thickness of ±3 mm. is smoked in about 6 days. As known, a certain degree of smoking is necessary for disinfecting the sheets, giving them a beautiful brown colour and preventing mould.

It is possible to smoke and to dry the rubber sheets of 3 mm. in 4½ or 5 days if the temperature is raised to between 50° C. and 60° C., but with these high temperatures the possibility of superheating and deterioration of the rubber becomes very great, so that very few plantations would risk this. (See Archief voor de Rubbercultuur 12; 1928 page 302, in the list among other things: the plantation numbered 54).

The crepe-rubber is also prepared from coagula of Hevea latex which however are not laminated or pressed but strongly rubbed out on heavy machines to thin sheets which in the case of first qualities of crepe-rubber have a thickness of 0.7 to 1.5 mm. and in the case of inferior qualities have a thickness between 1.0 and 2.0 mm.

The rubber which is spread out thinly, is completely washed during this process and intensively kneaded. After this laminating process it is hung vertically on horizontal laths and dried in the air in drying-houses. This drying requires at least 10 days. By using artificial heating this drying period may be reduced to 6 days, the temperature of the drying air however may not be raised above 35° C., as the rubber, which by the intensive laminating process is completely washed out misses nearly all the antioxidants and by the oxidation of the rubber hydro-carbon becomes very soon sticky and therefore unsalable. The soiling, bagging out and tearing of the sheets occurs sooner after hanging on horizontal laths, than with the smoking of sheet rubber, in which case the rubber has 3 or 5 times this thickness.

Many attempts to shorten the drying period of the rubber in different ways have been made, as the space necessary for suspending the rubber during the period, that the still damp rubber needs ventilation or heat in order to become dry, represents a very considerable cost of fixtures of a rubber plantation. For this purpose at Ceylon and also on the peninsula Malakka rough sheets of crepe-rubber are made from coagulated rubber, which are dried in heated rooms in vacuum and at a high temperature up to 90° C. and from which rooms the crepe-rubber is removed dry after some hours. The strips of rough, dry crepe are then pressed in blankets onto each other, which have a thickness of 0.5 to 2 cm.

The cost of such installations for drying in vacuum is very high with respect to the technical result and when it is considered that the crepe by the exposure to the high temperature shows irregularities and deterioration of the quality. The colour is also inferior compared with the standard crepe-rubber.

It has been proposed to treat rubber first as crepe-rubber and then to finish it as smoked sheet rubber by smoking it. As however the crepe-rubber has become very hard by the mechanical rubbing out, the drying period for the crepe sheets is not shorter than 6 days. The product obtained in this way has been brought on the market in some cases of need as smoked-crepe, in most cases however as a second quality.

A description of a direct method for quickly delivering the rubber after the coagulation of Hevea-latex and therefore to save the expense for building smoke-houses and drying-houses, is found in the Dutch Patent-Letter No. 16,653. The coagulated rubber is inflated in this case to a balloon with thin walls, after which the balloon of rubber is cut open and dried. If the rubber is blown out thin enough this drying in the air may be completed in 24 hours.

In practice however great losses take place through the rupture of the inflated balloon before the minimal thickness of the rubber sheet is reached, that the usefulness of the process is problematic and it has not passed the period of experiment.

Up to the present time there does not exist a process which makes it possible to deliver in an economical way the rubber which is quite valuable for the market, within 24 hours after the winning of the Hevea-latex to be coagulated. A systematical research in this direction however has given the following results:

Ascertaining the velocity of drying of sheet rubber of different thicknesses that has been flattened but not rubbed out and not washed, a thickness of 5 mm. proved to be sufficiently dry and thoroughly smoked in about 10 days by applying a temperature of 45° C. When the thickness was diminished to 3 mm., this sheet rubber dried in about 6 days. If however under certain precautions the thickness of the sheet is decreased till 1½ or 2 mm. there is not obtained a drying and smoking of the rubber in 3 or 4 days, as would be expected, but the surprising and unexpected effect is obtained, that within 24 hours the thin rubber is quite dry and shows a beautiful brown, smoked colour of sheet rubber.

Up to the present time this effect is unknown in preparing rubber in general and sheet rubber especially. The objections which are advanced by Dr. O. de Vries in his book on the preparing and qualities of plantation rubber against thin rubber sheets are generally known. Also in the "Handleiding voor de rubberbereiding", edited by the Rubberproefstations on Java, second edition, there is stated on page 76, dealing with the desired sheet-thickness, that the extreme limit of thickness is 3 to 3½ mm. and there is a warning against making the sheets thinner than 3 mm. to prevent a soft and limp product which easily bags out.

The precautions which should be taken for the preparing of thin, quickly drying rubber in order to attain the desired result may be illustrated by the following example.

Hevea-latex containing e. g. 30% dry rubber is poured out into a coagulation-pan until the latex-level is about 2 cm. high. Then so much coagulant is added (formic acid, acetic acid etc.) that the rubber is coagulated within half an hour to a soft cohering cake.

This cake is afterwards pressed manually or mechanically in order to increase its solidity, and then the cake is laminated by ordinary laminators for sheet rubber until a thickness of 1.5 to 2.5 mm. is reached. Hereafter the surface of the sheet is increased without causing undesired tensions in the sheet, by passing the sheet between the rollers of a so called printer, provided with grooves of such dimensions and mutual distance, that the volume of the rubber which is pressed away by the flat part of the rollers corresponds with the volume which can be taken up by the grooves. After a contingent washing of the rubber with water or disinfectants the thin sheet is dried and smoked preferably by spreading it out on horizontal racks of gauze or on a grate of bars, laths or wire, which racks afterwards preferably with a slight inclination are placed in the smoke-house as the surface of the sheet has been made very accessible for the drying influences by the special printer, the rubber is ready for export within 24 hours of smoking at a temperature of 45° C.

The objections which exist against making thin sheet-rubber with respect to the softness and limpness are removed by applying the special pattern for the printer according to the invention.

Formerly a pattern was used which placed stripes on the rubber exclusively in longitudinal direction, later on a diamond pattern was used, which seldom coincided at the upper and under surface of the sheet. At the present also two rollers are used in which are cut the same helices and which when rotating in opposite direction press the desired diamond pattern into the sheet rubber.

The grooves of this pattern are rectangular and have a breadth of 3 mm. and also a depth of 3 mm. whilst the distance between the grooves from border to border is 4 mm., so that the distance of the grooves between the center lines is 7 mm., whilst the inclination of the helix with the axis is about 65°.

If the thin rubber should be printed with the pattern with stripes in longitudinal direction or with the helix pattern described, the rubber would become too soft and the resistance to tensile stress would decrease.

The pattern that may be used for the process according to the invention consists also of a number of parallel helices and is cut in both calenders with an inclination of 65°, whilst the distance of the grooves between the centerlines is 2.5 to 3.5 mm., the depth of the V-shaped grooves is about 1.5 mm. and the largest breadth is also about 1.5 mm.

The grooves which are situated closely to each other are able to take up without tensions the rubber which is pressed away between the flat parts of the printer, the maximum thickness of the rubber cake being about 2 mm. and the minimum thickness being equal to some tenth parts of a millimeter.

The surface of the sheet rubber is strongly increased by this printer, so that the drying is accelerated importantly.

The resistance of the rubber against tearing is strongly increased by the influence of the printer and is much greater than e. g. of crepe-rubber of the same thickness. Apparently this is the consequence of the mesh-work of thickened ribs in the sheet.

The present invention is shown in the accompanying drawing in which:

Figure 1 and Figure 4 show the developed surfaces of the two rollers with the grooves making an angle of 65° with the axis of the roller.

The important advantages of the process are immediately obvious. As stated already it is usual in preparing rubber, to decrease the concentration of the latex to 15 to 20% of dry rubber to prevent the possibility that air-bubbles or gas-bubbles are formed.

With the present application however one is not restricted to these concentrations but one can apply without difficulty latex-concentrations of 30% and more of dry rubber because a thin layer of soft coagulated rubber is desirable. By making the period of coagulation short, the rubber remains soft and easy to treat.

When using pans for coagulating the latex, one finds that the same quantity of rubber can be coagulated in a pan with a latex-level of e. g. a height of 2 cm. and a concentration of 30% of dry rubber, as with a latex-level with a height of 4 cm. and a concentration of 15%, whilst in the former case the possibility of the forming of air- or gas-bubbles is much smaller. Moreover the first case has the great advantage that after half an hour the pan can be used again, the coagulum being already sufficiently hard, but in the second case it takes at least 1 or 2 hours before the laminating of the softer coagula of 15% latex will be possible. The dimensions of the pans can be accordingly modified as only half the height is used when applying latex of 30%.

It might be assumed that with the existing preparation of sheet rubber also latex of 30% may be coagulated in a thin layer. As however this industry always uses the thickness of 3 to 5 mm. for the rubber cake to be smoked, the flattening of a layer of 2 cm. thickness would not be sufficient for the desired solidity of the rubber cake with such a short coagulation-period, whilst with a longer coagulation-period of the latex of 30%, such a cake will be much too hard and not laminable any longer. This hardness is not reached so quickly when applying latex of 15%.

An advantage of using latex of 30% and more is a greater yield of the product, which is obtained by the coagulation and whereby more of the substances which are present in the latex, also coagulate. Another advantage of the present process is, that the soft rubber decreases the power consumption of the plant of laminators during the lamination.

The racks of gauze or bars, laths or wires already mentioned as recommendable means for the drying, prevent the backing out of the rubber-sheets and they can be brought more easily, quickly and economically into the smoking-house than the sheets which must be vertically suspended on horizontal laths in succession into the smokehouse.

As the smoking requires only 24 hours the necessary room of the smokehouse only needs to be about 10 to 20% of the room which is normally necessary, whilst the consumption of fuel is also reduced to 10 to 20% of the quantity which was required before.

The thin rubber, which is much suppler than the sheet-rubber with a thickness of 3 to 5 mm. can be packed in a much more economical way. The properties of this thin rubber are quite equal to the properties of the first quality sheet- or crepe-rubber. It belongs to the highest grouping in this class of first quality rubber by the conservation of natural substances from the latex in the prepared rubber when coagulating latex of 30% and more.

The advantages of the new process are thus:

(1) A drying and smoking, which can be finished within 24 hours.

(2) A saving of at least 50% on the cost of the coagulation pans.

(3) A saving on power-consumption for the mechanical treatment by using a soft coagulum.

(4) No enclosure of air or gas bubbles during the coagulation by using a thin layer of latex.

(5) No possibility for mould bacteria or fermentation, which are eliminated by the quick drying.

(6) No soft or limp rubber by the right choice of the surface of the printer.

(7) A strongly increased surface by the right distribution of the rubber pressed away and taken up in the grooves of the printer by which the velocity of the drying increases.

(8) In consequence of the horizontal position with many supporting surfaces on racks of gauze, bars, laths or wires no bagging out of the hot rubber occurs which in other cases takes place by too high a temperature, and a finishing which is too thin when suspending the sheets vertically on laths.

(9) A placing into the smoke-house which is speedier and more economical by preparing the racks with rubber out of the smoke-house.

(10) Reducing the necessary space of the smoke-house to 10 to 20% of the necessary space for thick sheets.

(11) A correspoding reduction to 10 to 20% of the necessary fuel.

(12) A packing which is more economical by the thinner and suppler product.

(13) A greater production of rubber as it has been proved possible to choose concentrated latex of 30% and more.

(14) Improvement of the properties of the rubber as a result of the higher latex-concentration, and the co-coagulation of the substances which improve the internal properties.

What I claim is,

1. A process for preparing sheet-rubber in such a form as to permit a rapid drying thereof, consisting in laminating a coagulated rubber cake to a sheet of 1.5 to 2.5 mm. in thickness, measured in moist condition, then passing said sheet through a printer comprising a set of helically grooved rollers thus obtaining a ribbed sheet having uninterrupted parallel ribs on each side spaced 2.5 to 3.5 mm. apart, the ribs on the one side of the sheet intersecting the ribs on the other side and the thickness of the sheet over the ribs being less than 3 mm., measured in humid condition, and finally drying and smoking the said ribbed sheet.

2. A process for preparing sheet-rubber in such a form as to permit a rapid drying thereof, consisting in laminating a coagulated rubber cake to a sheet of 1.5 to 2.5 mm. in thickness, measured in moist condition, then passing said sheet through a printer comprising a set of rollers having V-shaped helical grooves arranged therein, said grooves forming an angle of about 65° with the axis of the rollers, the width as well as the depth of the V-shaped grooves being 1.5 mm. and the distance between the center lines of two adjacent grooves being 2.5 to 3.5 mm., thereby producing a ribbed sheet having uninterrupted parallel ribs on each side, spaced 2.5 to 3.5 mm. apart, the ribs on the one side of the sheet intersecting the ribs on the other side and the thickness of the sheet over the ribs being less than 3 mm. measured in humid condition, and finally drying and smoking the said ribbed sheet.

3. A process as described in claim 2 in which the rubber cake to be laminated is obtained by coagulating rubber latex having a concentration of more than 20% of dry rubber spread out in a thin layer.

4. A new article of manufacture comprising a dried and smoked rubber sheet provided on its surface with uninterrupted parallel ribs, spaced 2.5 to 3.5 mm. apart, the maximum thickness of the sheet measured over the ribs being about 2.5 mm.

5. A new article of manufacture comprising a dried and smoked rubber sheet provided on both sides with uninterrupted parallel ribs being spaced 2.5 to 3.5 mm. apart, the ribs on the one surface of the sheet intersecting the ribs on the other side and the maximum thickness of the sheet measured over the ribs being about 2.5 mm.

6. A printer device for ribbing rubber sheets of 1.5 to 2.5 mm. in thickness comprising a set of rollers having V-shaped helical grooves arranged therein, said grooves forming an angle of about 65° with the axis of the rollers, the breadth as well as the depth of the V-shaped grooves being about 1.5 mm. and the distance between the center-lines of two adjacent grooves being 2.5 to 3.5 mm., adapted to produce a ribbed sheet having uninterrupted parallel ribs on each side, spaced 2.5 to 3.5 mm. apart, the ribs on the one side of the sheet intersecting the ribs on the other side and the thickness of the sheet over the ribs being less than 3 mm. measured in humid condition.

NICOLAAS HENDRIK van HARPEN.